July 27, 1965 B. J. LECHNER 3,197,744

FERROELECTRIC STORAGE CIRCUITS

Filed Dec. 4, 1963 3 Sheets-Sheet 1

INVENTOR.
BERNARD J. LECHNER
BY
Samuel Cohen
Attorney

FERROELECTRIC STORAGE CIRCUITS

Filed Dec. 4, 1963 3 Sheets-Sheet 2

INVENTOR.
BERNARD J. LECHNER
BY Samuel Cohen
Attorney

INVENTOR.
BERNARD J. LECHNER
BY
Samuel Cohen
Attorney 3,197,744
Patented July 27, 1965

3,197,744

FERROELECTRIC STORAGE CIRCUITS

Bernard J. Lechner, Princeton, N.J., assignor to Radio Corporation of America, a corporation of Delaware Filed Dec. 4, 1963, Ser. No. 328,090
17 Claims. (Cl. 340—173.2)

The present invention relates to ferroelectric control circuits which are useful in ferroelectric electroluminescent panel type displays, such as mural television displays, in ferroelectric memories, and in other ferroelectric storage and control circuits.

When an electric field is applied to a ferroelectric material, the material exhibits a relationship between the polarization of its "bound charge" and the applied field in the general form of the hysteresis loop exhibited by ferromagnetic materials. "Bound charge" refers to the electric dipoles in the material. By utilizing the ferroelectric material as the dielectric of a capacitor, this hysteresis effect can be employed for the storage of binary information, for the control and switching of electric signals, and for other purposes. Circuits employing such storage elements are discussed in Patent Nos. 2,695,397 and 2,695,398 to J. R. Anderson, and elsewhere in the literature.

A well known ferroelectric control circuit, termed a "transcharger," which is useful in panel type displays and elsewhere, is described in detail in Rajchman et al., Patent No. 2,900,622, issued August 18, 1959. One arrangement of a transcharger shown in the patent includes three ferroelectric elements, two of which are essentially in series with an alternating voltage source and a load, such as an electroluminescent element. The third ferroelectric element is coupled between the common connection of the first two ferroelectric elements and the setting and resetting pulse circuits. In one condition of the transcharger, the two series connected ferroelectric elements are polarized in opposite directions and "block" the transcharger. In the other condition of the transcharger, the two series connected ferroelectric elements are polarized in the same direction and "unblock" the transcharger.

When the transcharger is blocked, the two oppositely polarized ferroelectric elements act like a high value of impedance to the alternating voltage source and prevent the source from energizing the load. This results from the fact that on positive half cycles of the alternating voltage, one of the two ferroelectric elements is saturated in the positive sense and therefore does not switch any charge, thus preventing current flow in the circuit. On the negative half cycle of the alternating voltage wave, the other ferroelectric element is saturated in the negative sense and likewise blocks current flow. When the transcharger is unblocked, the ferroelectric elements polarized in the same direction act like a low impedance with respect to the alternating voltage source and permit the source to energize the load. This too can be explained in terms of switching of charge. On positive half cycles of the alternating voltage wave, both of the ferroelectric elements are saturated in the negative sense and can thus switch in unison causing current flow in the circuit. On the negative half cycle of the alternating voltage wave, both of the ferroelectric elements are saturated in the positive sense and likewise switch in unison.

It is desirable in the transcharger circuit described in the Rajchman et al. patent above that the ferroelectric material be of different thicknesses in different ones of the elements. The reasons are discussed in more detail below. When the transchargers are individually wired, this presents little difficulty. However, in present manufacturing techniques it is preferred to batch fabricate complete transchargers and, in fact, groups of transchargers at one time as, for example, by simultaneously "printing" many electrodes on a common ferroelectric element. When manufacturing transchargers in this way, the process is generally simpler and cheaper if the same thickness of ferroelectric material can be employed for all elements.

The present invention relates to improved transcharger circuits in which all ferroelectric elements can be of the same thickness. One embodiment of the invention includes three ferroelectric elements, as in the prior art. However, as contrasted to the prior art, two of these elements and the alternating voltage source are connected to form a bridge and the transcharger drivers are so arranged with respect to the alternating voltage source, that there is little tendency for the source to cause spurious blocking or unblocking of the transcharger.

The bridge above has four legs. The first and second of these legs each include a ferroelectric element, and at least one of the first and second legs also include a load such as an electroluminescent element in series with the ferroelectric element. The third and fourth legs of the bridge comprise, together, a substantially balanced alternating voltage source which is connected at the connection between the third and fourth legs to a point of reference potential. This connection may be through a relatively low impedance driver for the transcharger as, for example, a row pulse source. The third ferroelectric element of the transcharger is connected at one electrode to the connection between the first and second legs of the bridge and at the other electrode to the point of reference potential. This last connection may be made through a low impedance driver as, for example, a column pulse source.

With the transcharger so connected, there is little tendency for the alternating voltage source to cause current flow through the third ferroelectric element since, because of the balanced bridge, both electrodes of the third element are essentially at the same potential. Therefore, the alternating voltage source does not unblock the transcharger when it is blocked or, conversely, block the transcharger when it is unblocked.

The invention is discussed in greater detail below and is shown in the following drawings of which:

Figures 1, 2, 3A, 3B, 3C:
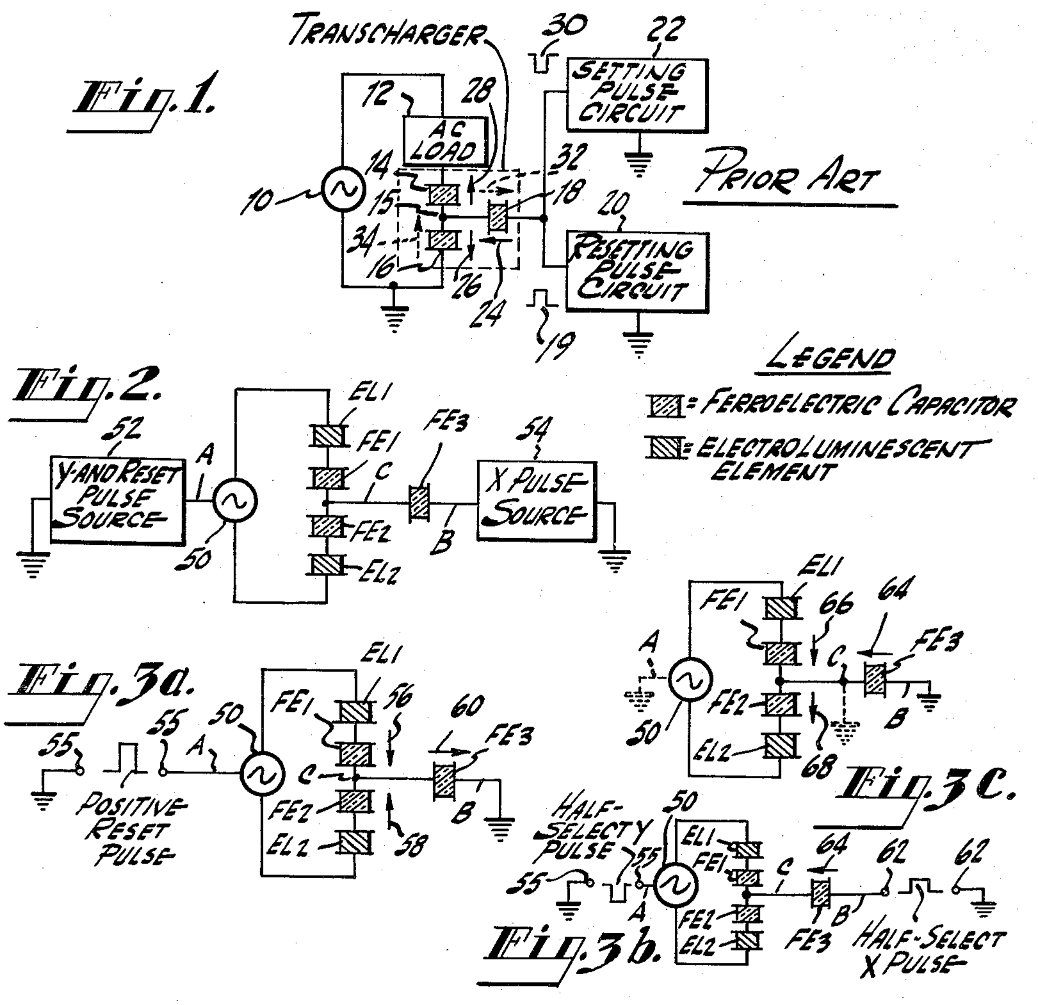
FIGURE 1 is a block and schematic circuit diagram of a prior art circuit employing ferroelectric storage elements.
FIGURE 2 is a block and schematic circuit diagram of an embodiment of the present invention.
Figure 4A:
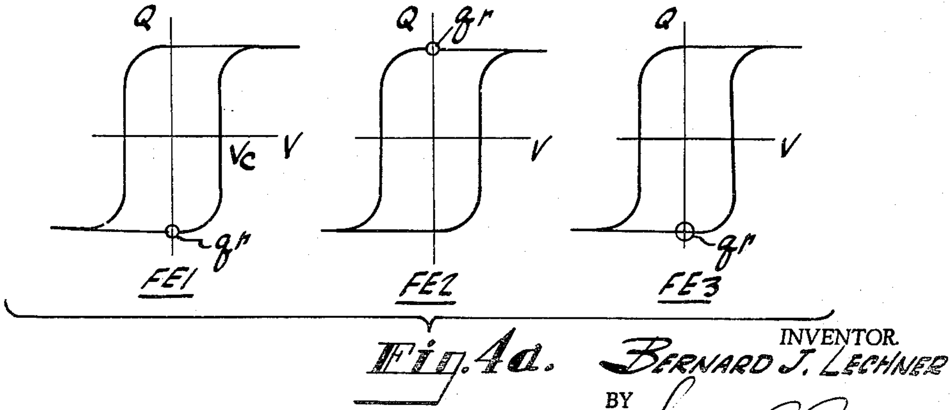
Figure 4B:
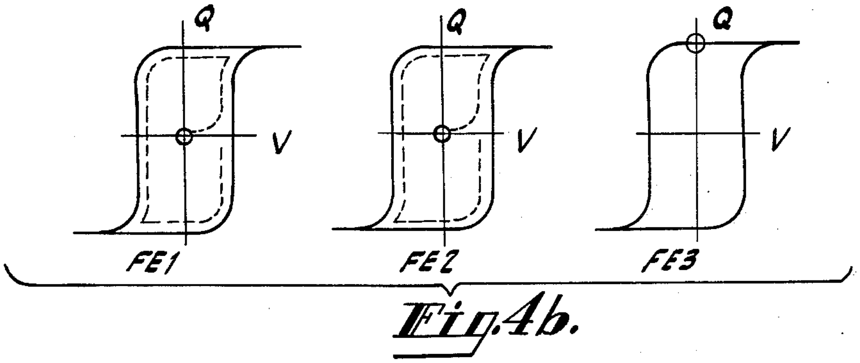
Figure 4C:
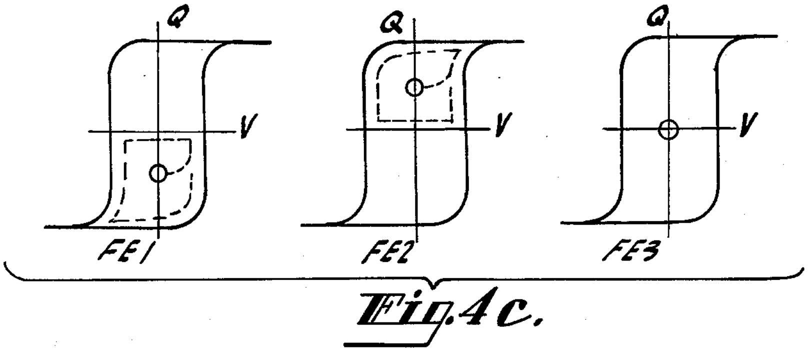
Figure 5:
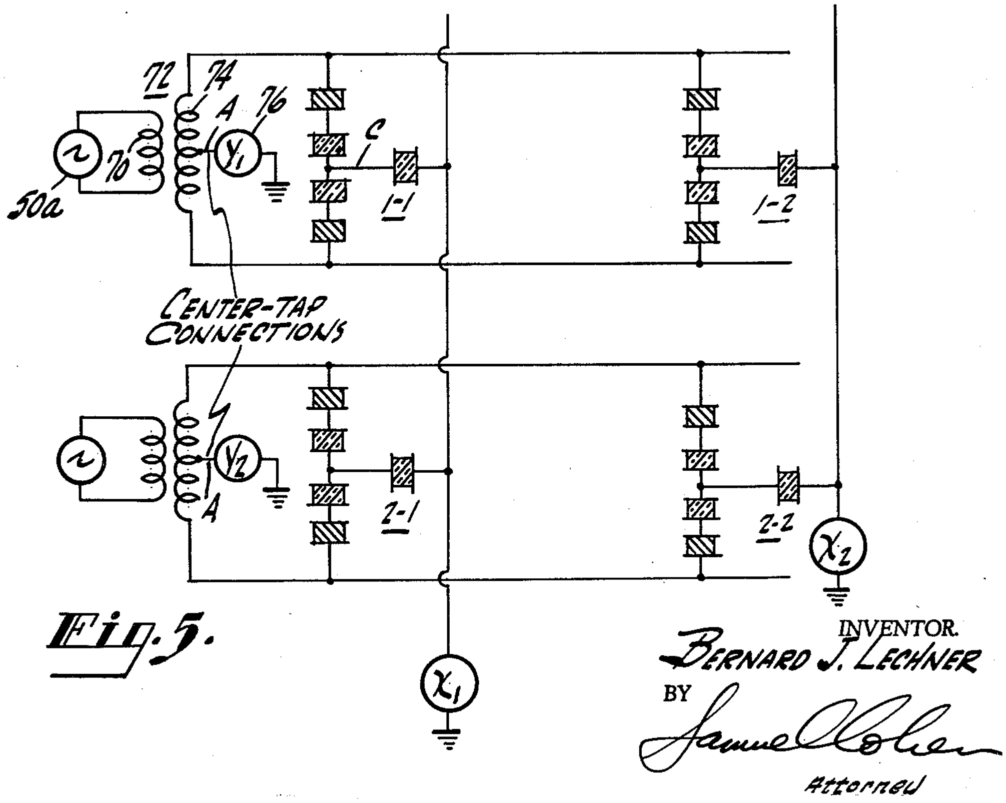
Figure 6:
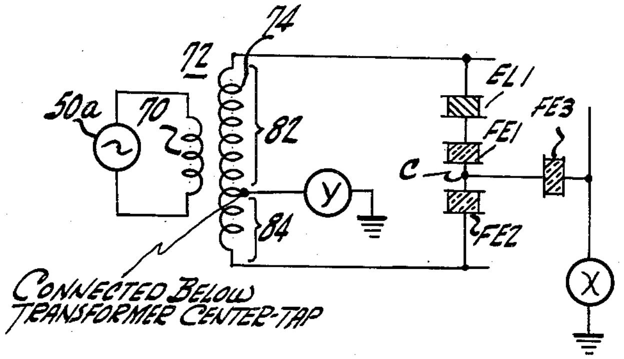
Figure 7:
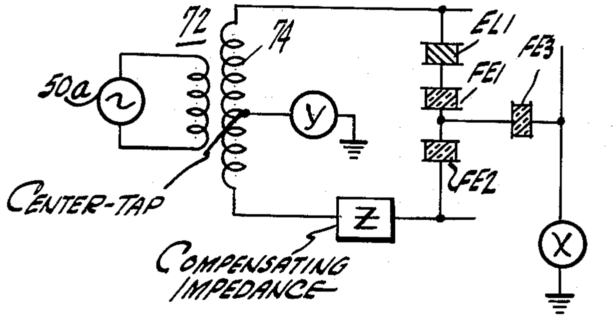
Figure 8:
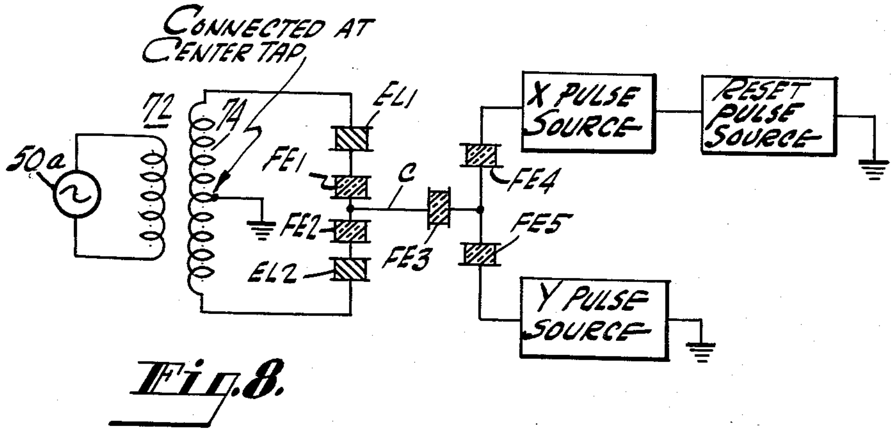

FIGURES 3*a*–3*c* are equivalent circuits to illustrate the operation of the circuit of FIGURE 2;

FIGURES 4*a*–4*c* are hysteresis loops of charge versus voltage to help explain the operation of the circuit of FIGURE 2;

FIGURE 5 is a schematic circuit diagram of a 2 x 2 array of transchargers according to one embodiment of the present invention; and FIGURES 6, 7 and 8 are schematic circuit diagrams of other embodiments of the present invention.

Throughout the figures similar reference numerals are applied to similar elements.

The circuit of FIGURE 1 is a schematic showing of a circuit described in detail in the Rajchman et al. patent mentioned above. The portion of the circuit within the dashed block is the transcharger. The circuit includes an alternating voltage source 10 essentially in series with a load 12 and two ferroelectric storage elements 14 and 16. Load 12 is illustrated in the patent as a capacitor. One terminal of the source 10 is connected to ground. A third ferroelectric storage element 18 is connected to a terminal 15 between storage elements 14 and 16.

Preferably, the dielectric material in the ferroelectric storage element (capacitor) 18 is thicker than the dielectric material of storage elements 14 and 16 and the dielectric material of element 16 is thinner than that of element 14. The terms "thin" and "thick" refer to the dimension of the dielectric material perpendicular to the metal capacitor electrodes—essentially the spacing between electrodes. The reasons are given shortly.

Blocks 20 and 22 represent the resetting and setting circuits, respectively. Diodes, resistors and the like not essential to an understanding of general principles of circuit operation are assumed to be present within block 20 (and also within block 22) and are not illustrated separately. These elements are shown in the Rajchman et al. patent.

In the operation of the circuit of FIGURE 1, a positive reset pulse 19 is initially applied to the transcharger from resetting pulse source 20. The positive pulse is of sufficient amplitude and duration to polarize the ferroelectric storage elements in the directions indicated by arrows 24, 26 and 28. It might be mentioned here that the convention employed in the figures is that the head of an arrow indicates a positive charge, and the tail of the arrow a negative charge. When a ferroelectric element is switched by a source producing a positive pulse, the head of the arrow is caused to face away from the source.

The arrows 26 and 28 point in opposite directions. This indicates that the ferroelectric capacitors 14 and 16 are polarized in opposite directions. Under these conditions—as explained in detail in the patent above—the capacitors 14 and 16 together act like a high value of impedance and essentially block the path between the alternating voltage source 10 and the load 12. Put another way, the major portion of the voltage available at the output of source 10 develops across the ferroelectric storage elements 14 and 16 and only a small voltage develops across the load 12.

A negative pulse 30 may now be applied to the transcharger by setting pulse circuit 22. The negative pulse "sees" ferroelectric storage element 18 in series with ferroelectric storage element 16. It also sees ferroelectric storage element 18 in series with ferroelectric storage element 14. Ferroelectric storage element 16 has a thickness of ferroelectric material which is less than that of element 14 and it is therefore a preferred path for the pulse 30. The pulse therefore switches (or partially switches) the polarization of ferroelectric storage elements 18 and 16. This switching is indicated schematically by dashed arrows 32 and 34. The amount of switching which occurs depends upon the amplitude and duration of pulse 30. Arrow 34 is now in the same direction as arrow 28. Thus, the circuit 10, 12, 14, 16 is unblocked, or at least partially unblocked, and a greater portion of the source voltage 10 is applied to the load 12.

In the circuit of FIGURE 1, the alternating voltage source 10 tends to cause some partial (spurious) switching (unblocking) of the transcharger. This is due to the fact that even though the ferroelectric elements 14 and 16 may be polarized in opposite directions and therefore be in a blocked condition, the alternate path 14, 18 to ground is unblocked (circuits 20 and 22 are of low impedance). However, since, as already indicated, the ferroelectric element 18 is made thicker than either of the elements 14 or 16 (element 18 is at least twice the thickness of element 14, for example), the nominal coercive voltage $V_C$ (defined as that value of voltage where the 60 c.p.s. hysteresis loop intersects the voltage axis) of element 18 is relatively high. Therefore, the alternate path 14, 18 presents a relatively high effective impedance to the source 10 and this lessens any tendency for the source 10 to reverse the polarization of element 14 and in this way to unblock the essentially series connected elements 14 and 16.

A transcharger circuit according to one embodiment of the present invention is shown in FIGURE 2. It includes an alternating voltage source 50 which is connected across the essentially series connected elements EL1, FE1, FE2 and EL2. As indicated in the legend, the EL elements are electroluminescent elements and the FE elements are ferroelectric capacitors. The alternating voltage source is essentially connected at its center tap to the Y and reset pulse source 52 which in turn is connected to ground. The point C in the circuit, that is, the common connection between ferroelectric elements FE1 and FE2, is connected through the third ferroelectric element FE3 to the X pulse source 54. The latter is connected at its other terminal to ground. All ferroelectric elements have the same thickness of ferroelectric material.

The circuit of FIG. 2 may be thought of as a balanced bridge. The first and second legs of the bridge each include an electroluminescent element and ferroelectric element—EL1 and FE1 in one case, and EL2 and FE2 in the other case. The third and fourth legs of the bridge each include a different half of the alternating voltage source 50, the connection between the third and fourth legs being connected (through a low impedance source 52) to ground. Thus, the connection C between the first and second legs is also always maintained at alternating current ground (in the absence of pulses supplied by the transcharger driver(s)—source 52 and/or source 54).

The operation of the circuit of FIG. 2 is depicted in FIGS. 3*a*–3*c*. The various sources involved are assumed to be low impedance sources so that when they are inactive a ground connection is substituted. However, it should be understood that the sources 52 and 54 need not be of low impedance when they are inactive. In some applications, it is desirable, for example, to make the source 52 have a high impedance during the interval that it is inactive. This may be achieved by coupling the source 52 to point A in the circuit through suitably biased diodes.

Initially, the Y and reset pulse source 52 applies a relatively large positive reset pulse across terminals 55, as indicated in FIGURE 3*a*. The amplitude of this pulse may be substantially greater than $2V_C$, where $V_C$ is the nominal coercive voltage of the ferroelectric elements as defined above. Since FE1, FE2, and FE3 are of identical thickness, they all have the same value of $V_C$. When the voltage applied to a ferroelectric element exceeds $V_C$ for a period of time at least equal to the characteristic switching time of the particular ferroelectric material being used, the ferroelectric will switch.

The reset pulse causes the ferroelectric elements FE1 and FE2 to be polarized in opposite directions as indicated by arrows 56 and 58 and ferroelectric element FE3 to be polarized in the direction of arrow 60. These various polarization states are also shown on the hysteresis loops of FIGURE 4*a* with the symbol $q_r$ in each case indicating the charge stored in the respective ferroelectric elements. As is clear from both FIGURES 3*a* and 4*a*, the ferroelectric elements FE1 and FE2 are oppositely polarized and therefore the source 50 is prevented from energizing the electroluminescent elements EL1 and EL2.

FIGURE 3*b* illustrates what occurs when the source 52 (FIGURE 2) applies a negative-going half select pulse across terminals 55 and the source 54 applies a positive-going half select pulse to terminals 62. The amplitudes of the respective pulses are such that ferroelectric capacitors FE1 and FE2 are discharged as indicated in FIGURE 4*b* and the polarization of the ferroelectric capacitor FE3 is switched to the direction indicated by the arrow 64 in FIG. 3*b*. The next cycle of the alternating voltage from source 50 now sees a low impedance through ferroelectric elements FE1 and FE2 since they are in an unblocked condition and the source therefore energizes the electroluminescent elements EL1 and EL2.

As illustrated by the dotted operating paths in FIGURE 4*b*, the first half cycle of the alternating voltage source 50 in effect completes the process of unblocking the transcharger. The charge switched on this first half cycle is only half that switched on subsequent half cycles.

FIGURE 3*c* illustrates the operation of the transcharger when in its unblocked condition. The alternating voltage source 50 causes the ferroelectric elements FE1 and FE2 to assume a given polarization state, such as indicated by the arrows 66 and 68. In this state, the ferroelectric elements present a relatively low impedance and the source 50 energizes the electroluminescent elements.

If only a half select X or only a half select Y pulse occurs when the transcharger elements are in the state shown in FIGURE 3*a*, then the transcharger is not unblocked. The half select pulse amplitude is, in general, less than $3/2V_C$ and is accordingly insufficient to change the states of the ferro-electric elements. On the other hand, the pulse amplitudes or durations can be so selected so as to partially unblock the ferroelectric elements and permit the electroluminescent elements to be lit at less than full intensity (half tone display). This is illustrated in FIGURE 4*c* where ferroelectric element FE3 is shown to have been switched half way. Conservation of charge requires that ferroelectrics FE1 and FE2 each be switched one quarter of the way as shown. As before and as illustrated by the dotted operating paths in FIGURE 4*c*, the first half cycle of the alternating voltage source 50 in effect completes the process of partially unblocking the transcharger.

When the transcharger is in its blocked condition, it might seem that the source 50 would tend to unblock the transcharger by causing voltages to develop along the unblocked paths EL1, FE1, FE3, and EL2, FE2, FE3. However, the alternating voltage source 50 is essentially connected at its center tap (terminal A) to ground. Therefore, the opposite terminal C of the balanced bridge is also always maintained at ground terminal. Terminal C is connected to one electrode of ferroelectric element FE3 and terminal B, which is also connected to ground, is connected to the other electrode of ferroelectric element FE3. Since both electrodes of the ferroelectric element FE3 are essentially at ground potential, there is no tendency for the alternating voltage source 50 to cause any voltage to develop across the third ferroelectric element FE3. Therefore, there is no tendency for the blocked ferroelectric elements FE1 and FE2 to become unblocked due to the alternate paths which are not blocked. Accordingly, all three of the ferroelectric elements may have the same impedance, that is, they may have the same thickness, without adversely affecting the operation of the transcharger.

The same reasoning as above applies during the operation of the circuit depicted in FIGURE 3*c*. Here, the transcharger is unblocked, that is, the ferroelectric elements FE1 and FE2 are polarized in the same direction. The source 50 has a tendency to cause spurious blocking through the path EL2, FE2, FE3. Note that in this path the ferroelectric elements FE3 and FE2 are polarized in the same direction and therefore present a low impedance. However, as in the case of FIGURE 3*a*, due to the balanced bridge arrangement, the point C is maintained at the same potential as the point B, namely ground potential, and no voltage develops across ferroelectric element FE3 due to the source 50. Accordingly, under these operating conditions also, the ferroelectric element FE3 may be of the same thickness as the other two ferroelectric elements FE1 and FE2.

In practice, the nonlinearity of ferroelectric elements FE1 and FE2 prevents the bridge from being perfectly balanced at high amplitudes of the alternating voltage from source 50. Consequently, the point C does not always remain identically at ground potential. However, the symmetry of the circuit and the symmetry of the nonlinear characteristics of the ferroelectric causes the waveform of the voltage at point C to be symmetrical about ground potential (i.e., it has no D.C. component). Thus, although the potential across ferroelectric element FE3 may deviate from zero, disturbances which may occur when this potential is positive will be reversed on the next half cycle of source 50 when this potential will be negative.

Another feature of the present circuit is the lessened tendency of the half select pulses to cause spurious unblocking. The alternating current source is not synchronous with the selection pulse sources. In the prior art circuit, it was possible for the peak value of voltage from source 10 (FIG. 1) to be present at point 15 (FIG. 1) at the same time that a half select pulse was applied from a source such as 22. The two voltages, if precaution were not taken, could add between points 15 and 18 and cause spurious unblocking. In the present circuit this is not possible as the corresponding point C (FIG. 2) is always at ground potentials regardless of the amplitude of the voltage supplied by source 50.

In the discussion above and in FIGURES 3*a* and 3*b* it has been indicated that the reset pulse has positive polarity, the half select Y pulse has negative polarity and the half select X pulse has positive polarity. It should be clear that if the polarities of all of these pulses are reversed the circuits described will still operate. In other words, the circuit may also be operated as described and with all of the features and advantages claimed if the reset pulse has negative polarity, the half select Y pulse positive polarity and the half select X pulse negative polarity.

A 2 x 2 array according to the present invention is shown in FIGURE 5. In this arrangement the alternating voltage source 50*a* is connected to the primary winding 70 of the transformer 72. The transformer 72 is common to the entire row of elements. The secondary winding 74 of the transformer is connected at its center tap to the Y and reset pulse source 76. For ease of illustration, this source is shown as a circle legended $Y_1$. The other terminal of source $Y_1$ is connected to ground. The source $Y_1$ is common to the entire row. Since source $Y_1$ has a low internal impedance, the center tap of the secondary winding 74 is essentially connected to ground. Accordingly, the opposite terminal C of the bridge is at ground potential, as already indicated.

FIGURE 5 indicates that the X pulse sources $X_1$ and $X_2$ are each common to a different column of the matrix. The source $X_1$ drives the transchargers of the first column and the source $X_2$ drives the transchargers of the second column.

The operation of the circuit of FIGURE 5 is quite analogous to that of the circuit already discussed in detail. It should also be clear that while illustrated as a 2 x 2 matrix, in practice there may be hundreds or thousands or more transchargers in the matrix.

In the circuits discussed so far, each transcharger includes two electroluminescent elements. In practice, these elements are located close to one another and act as a single light source. It is possible, however, to employ a single electroluminescent element per transcharger. The circuit may be the same as the circuit of FIGURE 2, however, in this case the bridge is slightly unbalanced. Since the alternating current impedance of the electroluminescent element is relatively low, the amount of unbalance may be tolerable in certain applications. In others, it is preferable to use an arrangement such as shown in FIGURE 6 or in FIGURE 7. In FIGURE 6, the secondary winding 74 is connected to the pulse source Y slightly at one side of the center tap. The connection is such that the voltage developed across section 82 of the secondary winding is greater than the voltage developed across the section 84 of the secondary winding by an amount sufficient to compensate for the additional impedance presented by the electroluminescent element EL1. In other words, the respective voltages across 84 and 82 are selected to be such that the terminal C of the bridge is always maintained at ground potential.

In the arrangement of FIGURE 7, the Y pulse source is connected to the center tap of the secondary winding 74 of transformer 72. This causes a slight unbalance in the bridge in view of the single electroluminescent element EL1. This unbalance is compensated for by placing a compensating impedance Z in the opposite leg of the bridge. This impedance may, for example, be a capacitor. A single compensating inpedance Z compensates for all of the transchargers in a given row of the matrix.

The fourth embodiment of the invention shown in FIGURE 8 is similar to the five-element transcharger. The five-element transcharger circuit includes a single electroluminescent element, such as EL1, and five ferroelectric capacitors FE1–FE5. The operation of this transcharger is discussed in detail in copending application Serial No. 195,453, which was filed on May 17, 1962, by E. Fatuzzo, and assigned to the same assignee as the present invention. The improved elements of the five-element transcharger, as shown in FIG. 8, includes an alternating voltage source 50*a* and a center-tapped secondary winding 74. As in the circuit of FIGURE 2, the balanced alternating voltage source together with the balanced bridge, maintains the bridge terminal C always at ground potential. This prevents spurious blocking and unblocking of the ferroelectric elements FE1 and FE2 by the alternating voltage source 50*a*. This five-element transcharger also has the important advantage that half select pulses do not cause spurious unblocking, for the reasons discussed herein, and for the additional reasons discussed in the copending application. In the improved five-element transcharger of FIG. 8, all ferroelectric elements may be of the same thickness, i.e. may have the same impedance.

The physical construction of the various transcharger circuits described in this invention can proceed in a variety of ways analogous to techniques previously described for the construction of transcharger circuits. In particular, the fabrication techniques described in the copending application Serial No. 195,453, can be applied to the circuits described in this application.

What is claimed is:

1. A transcharger circuit comprising, in combination:
a bridge network having four legs, the first and second legs each including a ferroelectric element, and at least one of said first and second legs also including a load element in series with the ferroelectric element, and the third and fourth legs comprising together a substantially balanced alternating voltage source which is connected at the connection between the third and fourth legs to a point of reference potential;
means coupled to said bridge network for applying a pulse thereto for causing the two ferroelectric elements to assume an unblocked condition, whereby upon termination of said pulse they tend to present a low impedance to said source;
means coupled to said bridge network for applying a pulse thereto for causing the two ferroelectric elements to assume a blocked condition, whereby upon termination of said last-named pulse they present a high impedance to said source; and
a third ferroelectric element coupled between the junction of the first and second legs of the bridge and said point of reference potential.

2. A transcharger circuit comprising, in combination:
a bridge network having four legs, the first and second legs each including a ferroelectric element, and at least one of said first and second legs also including an electroluminescent element in series with the ferroelectric element, and the third and fourth legs comprising together a substantially balanced alternating voltage source which is connected at the connection between the third and fourth legs to a point of reference potential;
means coupled to said bridge network for applying a pulse thereto for causing the two ferroelectric elements to assume an unblocked condition, whereby upon termination of said pulse they tend to present a low impedance to said source;
means coupled to said bridge network for applying a pulse thereto for causing the two ferroelectric elements to assume a blocked condition, whereby upon termination of said last-named pulse they tend to present a high impedance to said source; and
a third ferroelectric element providing a relatively low impedance path in both the blocked and unblocked conditions of said first two ferroelectric elements coupled between the junction of the first and second legs of the bridge and said point of reference potential.

3. A transcharger circuit comprising, in combination:
a balanced bridge network having four legs, the first and second legs each including, in series, a ferroelectric element and an electroluminescent element, and the third and fourth legs comprising together a balanced alternating voltage source which is connected at the connection between the third and fourth legs to a point of reference potential;
means coupled to said bridge network for applying a pulse thereto for causing the two ferroelectric elements to assume an unblocked condition, whereby upon termination of said pulse they tend to present a low impedance to said source;
means coupled to said bridge network for applying a pulse thereto for causing the two ferroelectric elements to assume a blocked condition, whereby upon termination of said last-named pulse they tend to present a high impedance to said source; and
a third ferroelectric element providing a relatively low impedance path in both the blocked and unblocked conditions of said first two ferroelectric elements coupled between the junction of the first and second legs of the bridge and said point of reference potential.

4. A transcharger circuit comprising, in combination:
first and second pulse sources, one for producing pulses of one polarity, and the other for producing pulses of the opposite polarity;
a bridge network having four legs, the first and second legs each including a ferroelectric element, and at least one of said first and second legs also including a load element in series with the ferroelectric element, and the third and fourth legs comprising together a substantially balanced alternating voltage source which is connected at the connection between the third and fourth legs through said first pulse source to a point of reference potential; and
a third ferroelectric element providing a relatively low impedance path in both the blocked and unblocked conditions of said first two ferroelectric elements connected at one electrode to the connection between the first and second legs of the bridge and at the other electrode through said second pulse source to said point of reference potential.

5. A transcharger circuit comprising, in combination:
first and second pulse sources, one for producing pulses of one polarity, and the other for producing pulses of the opposite polarity;
a bridge network having four legs, the first and second legs each including a ferroelectric element, and at least one of said first and second legs also including a load element in series with the ferroelectric element, and the third and fourth legs comprising together an alternating voltage source which provides 180° out-of-phase voltages to the first and second legs respectively at levels of amplitude such that the connection between the first and second legs is at ground potential, and said source being connected at the connection between the third and fourth legs through said first pulse source to ground; and
a third ferroelectric element providing a relatively low impedance path in both the blocked and unblocked conditions of said first two ferroelectric elements connected at one electrode to the connection between the first and second legs of the bridge and at the other electrode through said second pulse source to ground.

6. A transcharger circuit as set forth in claim 5 wherein said load is located solely in one of said first and second legs and in which said alternating voltage source is connected at a point other than the center tap of the source through said first pulse source to ground.

7. A transcharger circuit as set forth in claim 5 wherein said load is located solely in one of said first and second legs and in which said alternating voltage source is connected at its center tap through said first pulse source to ground, and further including an impedance in one of the third and fourth legs for compensating for the unbalance in the bridge due to said load.

8. A transcharger circuit as set forth in claim 5 wherein said first and second legs each include a load element and said load elements are of equal impedance, and in which said alternating voltage source is connected at its center tap through said first pulse source to ground.

9. A transcharger circuit comprising, in combination:
first and second pulse sources, one for producing pulses of one polarity, and the other for producing pulses of the opposite polarity;
a bridge having four legs, the first and second legs each including an electroluminescent element in series with a ferroelectric element, and the third and fourth legs comprising together a substantially balanced alternating voltage source which is connected at the connection between the third and fourth legs through said first pulse source to a point of reference potential; and
a third ferroelectric element providing a relatively low impedance path in both the blocked and unblocked conditions of said first two ferroelectric elements connected at one electrode to the connection between the first and second legs of the bridge and at the other electrode through said second pulse source to said point of reference potential.

10. A transcharger circuit comprising, in combination:
first and second pulse sources for operating the transcharger;
a bridge network having four legs, the first and second legs each including a ferroelectric element, and at least one of said first and second legs also including a load element in series with the ferroelectric element, and the third and fourth legs comprising together a substantially balanced alternating voltage source which is connected at the connection between the third and fourth legs to a point of reference potential;
fourth and fifth ferroelectric elements connected together at one electrode, and each connected at its other electrode through a different one of said pulse sources to said point of reference potential; and
a third ferroelectric element providing a relatively low impedance path in both the blocked and unblocked conditions of said first two ferroelectric elements connected at one electrode to the connection between the first and second legs of the bridge and at the other electrode to the connection between the fourth and fifth ferroelectric elements.

11. A transcharger circuit comprising, in combination:
first and second pulse sources for operating the transcharger;
a bridge network having four legs, the first and second legs each including an electroluminescent element in series with the ferroelectric element, and the third and fourth legs comprising together a substantially balanced alternating voltage source which is connected at the connection between the third and fourth legs to a point of reference potential;
fourth and fifth ferroelectric elements connected together at one electrode, and each connected at its other electrode through a different one of said pulse sources to said point of reference potential; and
a third ferroelectric element providing a relatively low impedance path in both the blocked and unblocked conditions of said first two ferroelectric elements connected at one electrode to the connection between the first and second legs of the bridge and at the other electrode to the connection between the fourth and fifth ferroelectric elements.

12. A transcharger circuit comprising, in combination:
a balanced bridge network having four legs, the first and second legs each including a ferroelectric element and a light producing load element, and the third and fourth legs comprising, together, a balanced alternating voltage source which is connected to ground at the connection between the third and fourth legs;
means coupled to said bridge network for applying a pulse thereto for causing the two ferroelectric elements to assume an unblocked condition, whereby upon termination of said pulse they tend to present a low impedance to said source;
means coupled to said bridge network for applying a pulse thereto for causing the two ferroelectric elements to assume a blocked condition, whereby upon termination of said last-named pulse they tend to present a high impedance to said source; and
a third ferroelectric element providing a relatively low impedance path in both the blocked and unblocked conditions of said first two ferroelectric elements coupled between the junction of the first and second legs of the bridge and ground.

13. A transcharger circuit comprising, in combination:
a bridge network having four legs, the first and second legs each including a ferroelectric element, and at least one of the first and second legs also including a light producing load element in series with the ferroelectric element, and the third and fourth legs comprising, together, a substantially balanced alternating voltage source which is connected at the connection between the third and fourth legs to a point of reference potential;
means coupled to said bridge network for applying a pulse thereto for causing the two ferroelectric elements to assume an unblocked condition, whereby upon termination of said pulse they tend to present a low impedance to said source;
means coupled to said bridge network for applying a pulse thereto for causing the two ferroelectric elements to assume a blocked condition, whereby upon termination of said last-named pulse they tend to present a high impedance to said source; and
a third ferroelectric element providing a relatively low impedance path in both the blocked and unblocked conditions of said first two ferroelectric elements coupled between the junction of the first and second legs of the bridge and said point of reference potential.

14. In combination,
two ferroelectric storage elements essentially connected in series:
an alternating voltage source connected across the elements;
means other than said source coupled to said elements for switching them in the same polarization direction to place them in an unblocked condition, whereby they present a low impedance to said source;
means other than said source coupled to said elements for switching them in opposite polarization directions to place them in a blocked condition, whereby they present a high impedance to said source;
a path including a reactive element which exhibits a relatively low alternating current impedance when the ferroelectric elements are either in the blocked or unblocked condition connected between the common connection of the two elements and a point of reference potential, whereby when the elements are in their blocked condition, the alternating voltage source tends spuriously to reverse the polarity of the charge stored in one of said elements by causing conduction through said path and thereby tends spuriously to unblock said elements; and means for lessening the tendency of said elements spuriously to unblock, comprising means connecting said point of reference potential to a connection to said voltage source which maintains said common connection substantially at said reference potential.

15. In combination, a pair of ferroelectric storage elements essentially connected in series;

an alternating voltage source connected across the elements;

means coupled to said elements for applying a pulse thereto for switching them in the same polarization direction to place them in an unblocked condition, whereby upon termination of said pulse said elements tend to present a low impedance to said source;

means coupled to said elements for applying a pulse thereto for switching them in opposite polarization directions to place them in a blocked condition, whereby upon termination of said pulse said elements tend to present a high impedance to said source;

a path including a third ferroelectric element connected between the common connection of the two elements and a point of reference potential, whereby when the elements are in their blocked condition, the alternating voltage source tends spuriously to reverse the polarity of the charge stored in one of said elements by causing conduction through said path and thereby tends spuriously to unblock said elements; and means for lessening the tendency of said elements spuriously to unblock, comprising means connecting said point of reference potential to a connection to said voltage source which maintains said common connection substantially at said reference potential.

16. In combination, a pair of ferroelectric storage elements essentially connected in series;

means coupled to said elements for applying a pulse thereto for switching them in the same polarization direction to place them in an unblocked condition, whereby upon termination of said pulse they tend to present a low impedance;

means coupled to said elements for applying a pulse thereto for switching them in opposite polarization directions to place them in a blocked condition, whereby upon termination of said last-named pulse they tend to present a high impedance;

a third ferroelectric element which exhibits a relatively low impedance when the ferroelectric elements are either in the blocked or unblocked condition connected between the common connection of the two elements and a point of reference potential; and means for maintaining said common connection substantially at said reference potential both during the blocked and unblocked conditions of said pair of ferroelectric elements.

17. In combination, a pair of ferroelectric storage elements essentially connected in series;

means coupled to said elements for applying a pulse thereto for switching them in the same polarization direction to place them in an unblocked condition, whereby upon termination of said pulse they tend to present a low impedance to a voltage source;

means coupled to said elements for applying a pulse thereto for switching them in opposite polarization directions to place them in a blocked condition, whereby upon termination of said last-received pulse they tend to present a high impedance to said source;

a third ferroelectric element which exhibits a relatively low impedance when the ferroelectric elements are either in the blocked or unblocked condition connected between the common connection of the two elements and ground; and an alternating voltage source connected across said pair of ferroelectric elements and connected to ground at a point in its circuit to maintain said common connection substantially at ground, both during the blocked and unblocked conditions of said pair of ferroelectric elements.

References Cited by the Examiner

UNITED STATES PATENTS

| | | | |
|---|---|---|---|
| 2,884,618 | 4/59 | Epstein | 340—173.2 |
| 2,900,622 | 8/59 | Rajchman | 340—173.2 |
| 2,905,830 | 9/59 | Kazan | 340—173.2 X |

IRVING L. SRAGOW, *Primary Examiner.*